Nov. 18, 1924.
F. N. MOERK
1,516,112
LIQUID TREATING APPARATUS
Filed July 10, 1923  4 Sheets-Sheet 1
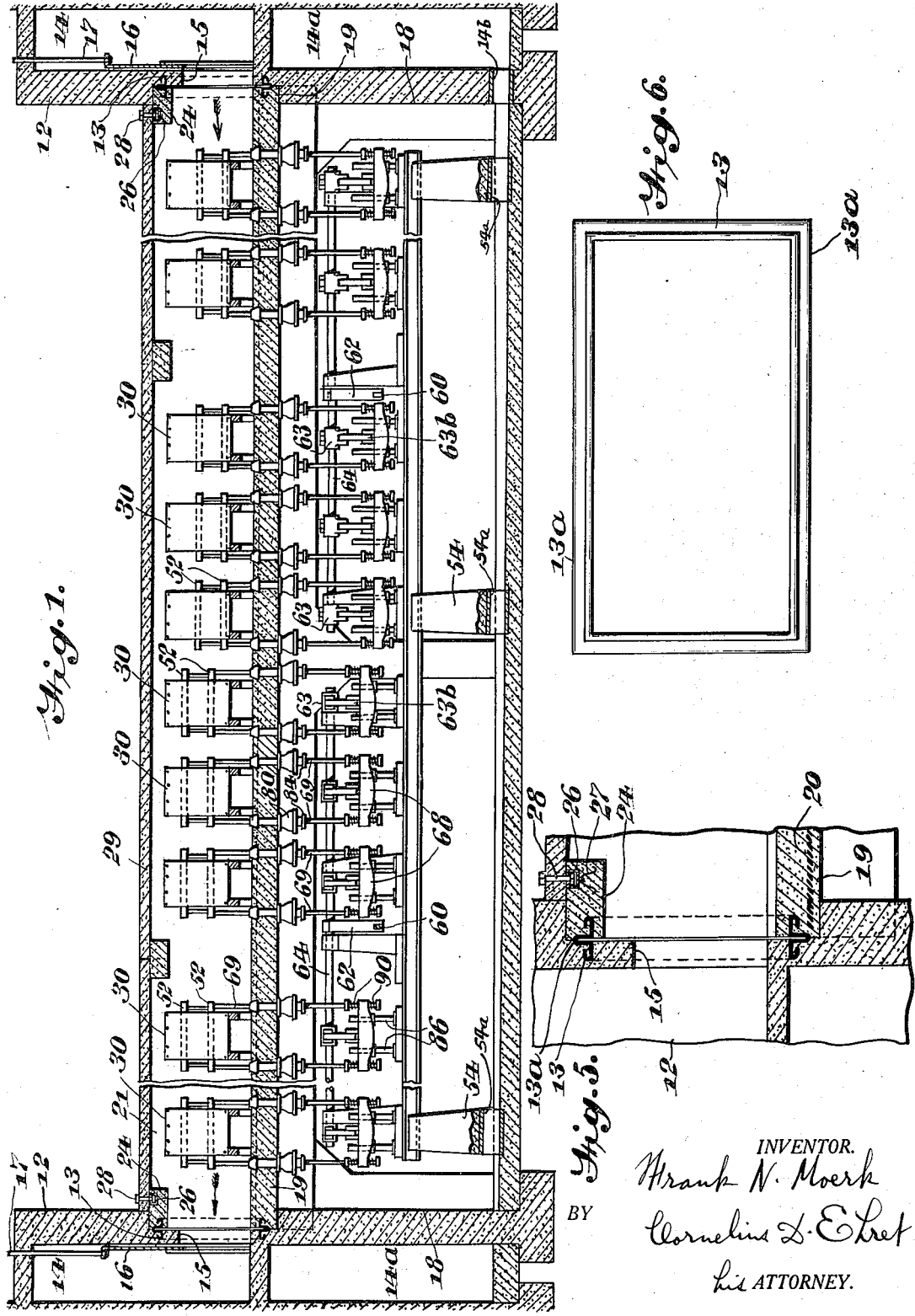
INVENTOR.
Frank N. Moerk
Cornelius D. Ehret
BY
his ATTORNEY.

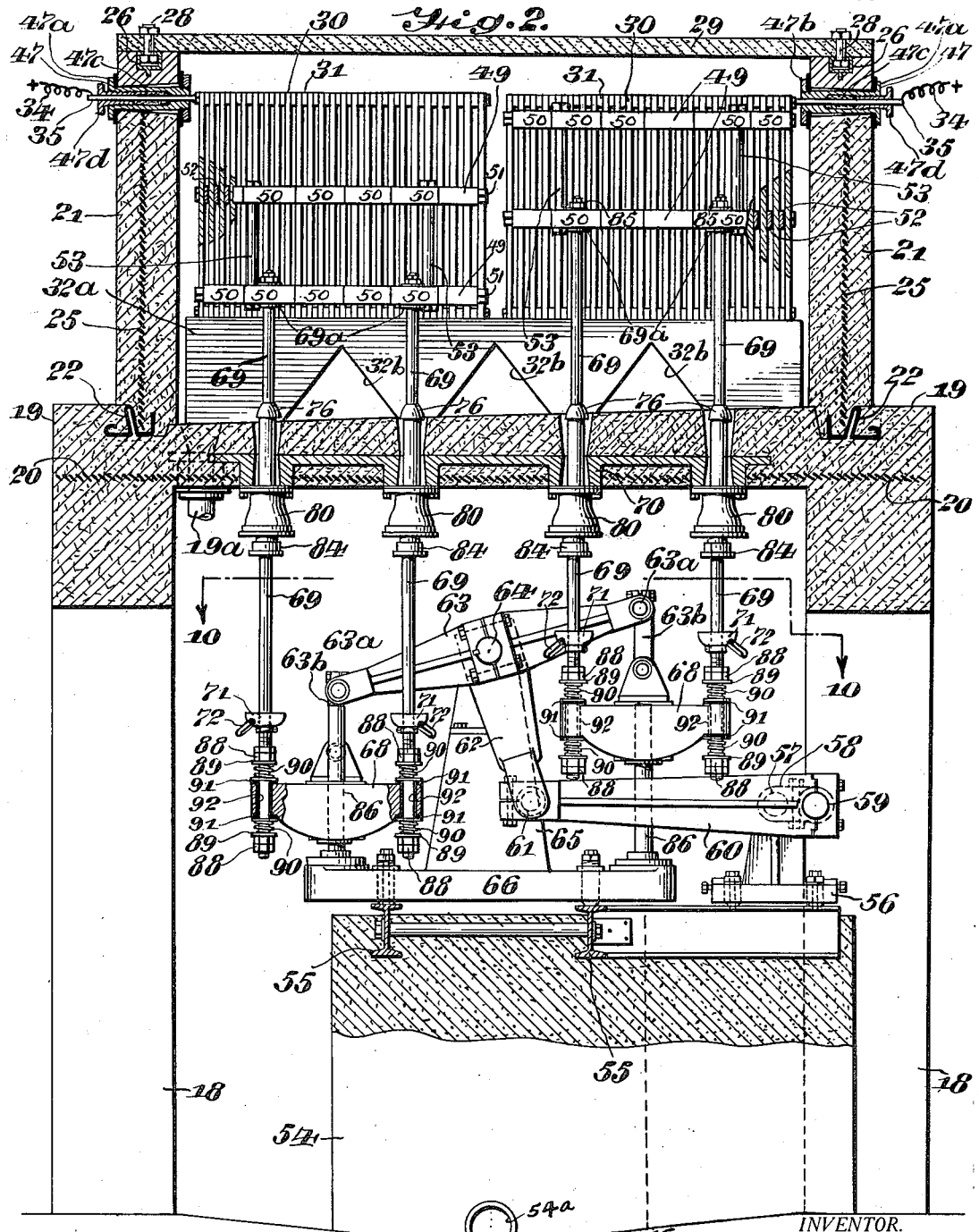

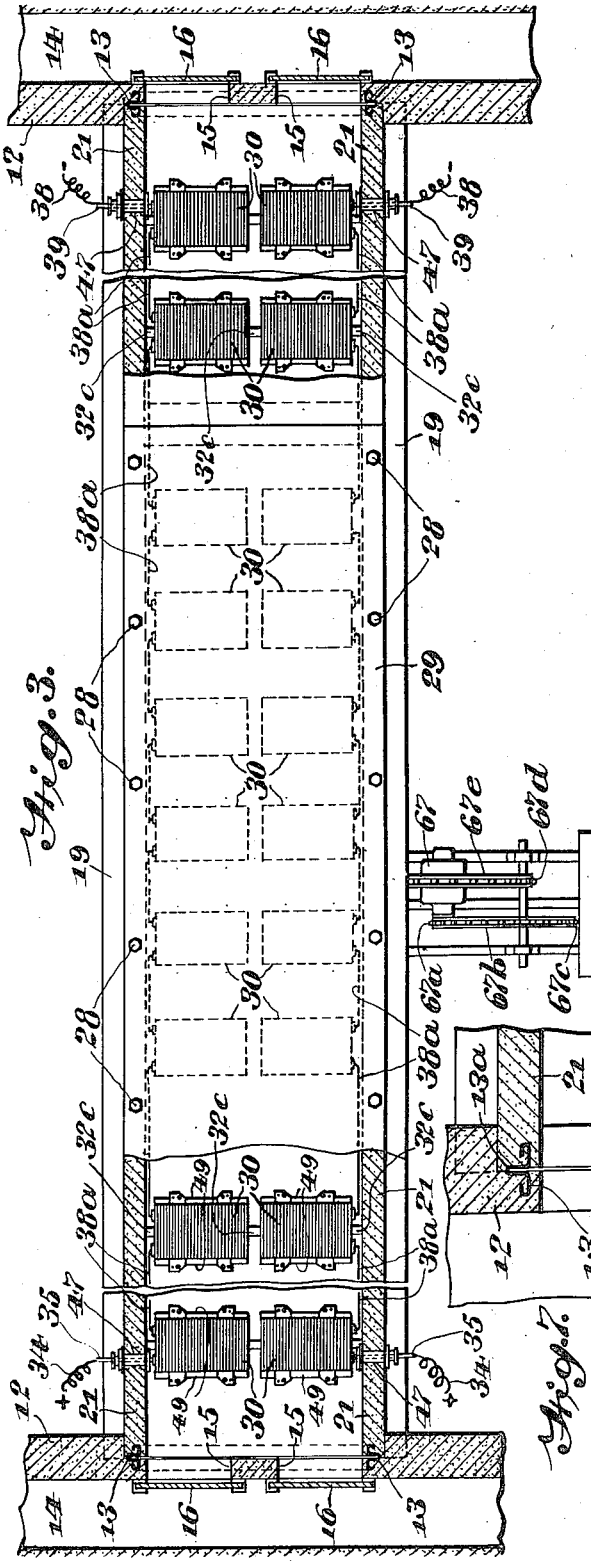

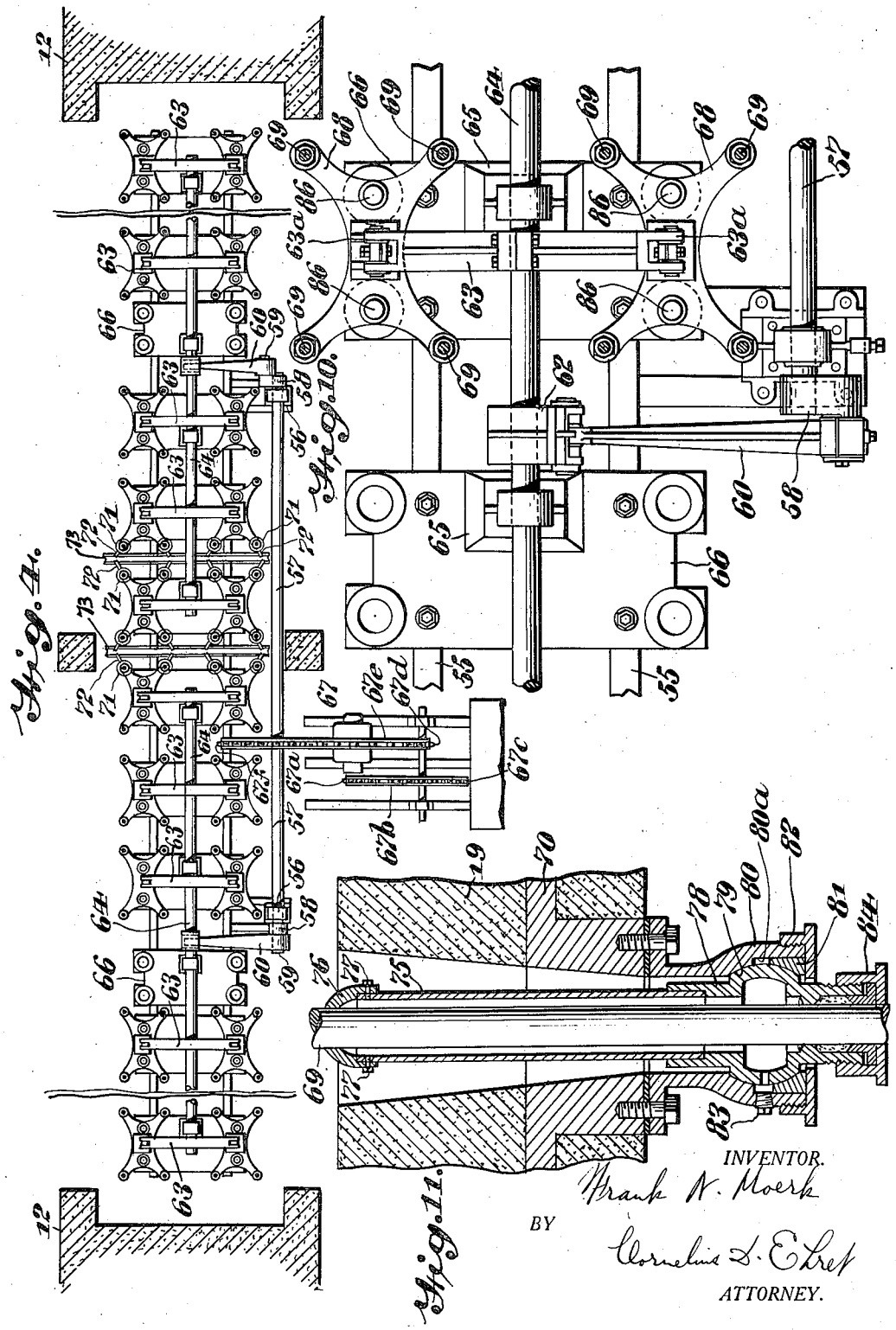

Patented Nov. 18, 1924.

1,516,112

UNITED STATES PATENT OFFICE.

FRANK N. MOERK, OF PHILADELPHIA, PENNSYLVANIA, ASSIGNOR TO CLARENCE P. LANDRETH, OF PHILADELPHIA, PENNSYLVANIA.

LIQUID-TREATING APPARATUS.

Application filed July 10, 1923. Serial No. 650,593.

*To all whom it may concern:*

Be it known that I, FRANK N. MOERK, a citizen of the United States, residing in the city and county of Philadelphia, State of Pennsylvania, have invented a new and useful Liquid-Treating Apparatus, of which the following is a specification.

My invention relates to apparatus particularly suited for employment in connection with the treatment of liquids.

In Letters Patent No. 1,139,778, issued to Clarence P. Landreth on May 18, 1915, is disclosed a process for the treatment of water, sewage, etc., and a form of mechanism which may be employed in carrying out the said process. The mechanism of the patent employs electrodes, between which the sewage to be treated flows, and is provided with paddles for agitating the sewage in order to prevent clogging between the electrodes or solids adhering thereto in excessive amounts, and to break up the solid matter contained in the sewage. It is to this general type of apparatus that my invention is directed.

In order to properly treat great quantities of sewage, large tanks are required, as the treatment of sewage from even a small city requires treating capacity of several million gallons daily. Heretofore, the treating tanks have been constructed principally of wood and, owing to the great size and length required to secure the necessary capacity, many joints have been necessary and much shoring needed. In constructions of this character, difficulty has been experienced in maintaining alignment and in preventing leakage at the numerous joints. By employing concrete as a tank material and providing expansion joints, there is no limit to the length of tank or treating flume which may be built.

It is the object of my invention to provide an improved form of tank for the liquid which is to be treated and an improved form of mechanism for agitating the liquid and for breaking up solids which may be contained therein.

For an illustration of one of the various forms which my invention may take reference is to be had to the accompanying drawing wherein:

Fig. 1 is a view, in side elevation of a portion of a tank and mechanism embodying my invention.

Fig. 2 is a transverse sectional view of the apparatus of Fig. 1.

Fig. 3 is a view, partially in plan and partially in section, of the apparatus of Fig. 1.

Fig. 4 is a sectional plan view of the apparatus of Fig. 1, showing the motor and certain other portions of the driving mechanism.

Fig. 5 is an enlarged detail view, in section, of a portion of the apparatus of Fig. 1.

Fig. 6 is a view, in end elevation, of the expansion joint shown in Fig. 5.

Fig. 7 is an enlarged sectional plan view of a portion of the apparatus of Figs. 1 and 5.

Fig. 8 is a bottom plan view of a portion of one of the scraper or agitating units of Fig. 2.

Fig. 9 is a sectional view of a portion of one of the banks of electrodes shown in Fig. 2.

Fig. 10 is a view taken on the line 10—10 of Fig. 2.

Fig. 11 is an enlarged vertical sectional view of one of the stuffing boxes shown in Fig. 2.

The tank structure comprises end portions 12 preferably of concrete in which expansion or bellows joint members 13 of rectangular form, as shown in Fig. 6, are embedded. But one edge of expansion joint members 13 is embedded in the portion 12, as shown more clearly in Fig. 5. As shown in Figs. 1 and 3, the end sections 12 are each provided in their upper portions with a hollow space 14 serving as a flume and with two passages 15 leading from said flume to the interior of the tank, said outlets being controlled by gates or valves 16 raised and lowered to open and close the passages 15, by means of operating rods 17. A gate 16 is provided for each of the passages 15. The sewage or other fluid flows into the tank through the openings 15 at the right hand end, and after passing between the banks of electrodes as hereinafter explained, discharges through the openings 15 at the left hand end of the tank. The lower space 14ª (Fig. 1) in one of the end sections 12 may be utilized as a drain through which to conduct waste water flowing through passage 14ᵇ, from the pit beneath the tank.

When the end portions 12 have been poured, the pillars 18 (Fig. 2) which may also be of concrete are poured, and thereafter the concrete bottom portion 19 may be poured, steel reenforcing 20 being provided in such bottom portion. When pouring the bottom portion 19, the lower edge of the expansion joint 13 is surrounded by the concrete, as shown in Fig. 5.

When pouring the bottom 19, expansion joint members 22 are partially embedded therein as shown more clearly in Fig. 2, such members 22 extending longitudinally of the tank. These members, as well as joints 13, may be of lead or other flexible material.

After the bottom 19 has been poured, the side portions 21 may then be poured, the bottom edges thereof embedding the inner edges of the joints 22. The sides 21, at their ends, have formed integrally therewith transverse portions 24 (Fig. 1), such side portions 21 together with their end portions 24 surrounding that portion of the inner edge of the expansion joint 13 which is not embedded in the bottom 19. Reinforcing members 25 are embedded in the side portions 21.

The bottom 19 is inclined slightly (Fig. 2) and provided with a series of drains 19ª whose lower ends are controlled by valves (not shown), so that the tank may be readily flushed and cleansed from time to time.

The ends of expansion joints 22 are preferably welded or soldered to the expansion joints 13. The intermediate portions 13ª (Figs. 5 and 7) of the members 13 are engaged by the concrete only on their outer surfaces, so that upon any separating movement of adjoining sections such as the side plates 21 and end plates 12, the joint 13 may spread. Such movement may occur through changes in temperature or by reason of other conditions, and if the parts 21 and 12 should again resume their normal positions, the portions 13ª can again assume their original shape.

Similarly, upon relative transverse movement of the sides 21 and the bottom 19, the intermediate portion of the expansion joint member 22 will be flexed and, due to the fact that its edges are embedded in the side and bottom portions, no liquid can pass between the sides and bottom as a result of said movement.

Channel inserts 26 are embedded in the sides 21 when such sides are being poured (Figs. 2 and 5). The inserts 26 are anchored in place by strips of metal 27 that extend through eyes formed thereon, and serve to hold the heads of bolts 28 by means of which a cover plate 29, which may also be of concrete, is held in place. The channel formation of the inserts 26 permits the bolts 28 to be adjusted longitudinally of the tank, to bring them in register with holes formed in the cover 29.

As shown in Figs. 1, 2 and 3, there are two rows of electrodes, arranged in groups or banks 30, composed of electrode-plates 32 and 33 having spacers 31 disposed in a plane parallel to the path of movement of the fluid, the fluid flowing between the plates and subjected to electrolytic treatment as hereinafter explained.

The electrodes 30 rest upon baffle plates 32ª (Fig. 2) that are provided with openings or passages 32ᵇ. Baffles 32ᶜ (Fig. 3) on the sides of the tank deflect the liquid from such sides to the paths between the electrodes. The construction of the groups of electrodes is shown more clearly in Fig. 9, wherein the plates are divided into two interspersed groups (positive and negative) 32 and 33. The positive plates 32 are connected to a source of current (not shown) through a wire 34, conducting rod 35, conducting block 36, and rod 37. The negative plates 33 have electrical connection with a wire 38ª, through a rod 39, a block 40, and a rod 41. The wires 38ª connect the various banks of electrodes in the manner shown in Figs. 3 and 9, through connections similar to those shown in Fig. 9, and the negative terminals 38 extend through the bushings 47 at the right hand end of the tank. The plates 32 and 33 are held together or held in place by bolts 42. The plates 32 are insulated from the rod 41 and the block 40 by sleeves 44 of insulating material and an insulating bushing 45, while the plates 33 are insulated from the rods 37 by means of insulating bushings 46.

As shown in Figs. 2 and 3, packing glands having sleeves 47 through which the endmost conductors 35 and 39 respectively extend, are each provided with an outer flange 47ª and a nut 47ᵇ. The sleeve 47 is clamped tightly against the wall of the tank by means of the nut 47ᵇ, and is recessed intermediate its ends for the reception of packing material 47ᶜ. The packing material is compressed by means of a threaded member 47ᵈ, to prevent leakage of liquid through the sleeve, the member 47ᵈ having screw threaded engagement with the interior of the sleeve 47. A packing gland is provided at one end of the tank for each of the positive leads to the two rows of electrodes, as shown in Fig. 3 and at the opposite end of the tank, two packing glands having sleeves 47 are provided through which the negative terminals extend, one packing gland at each end of the tank thus serving for an entire row of electrodes.

Current flowing from the wire 34 to the electrodes 32 passes through the liquid which flows through the tank and to the negative electrodes 33 and thence through the conductors 41, 40 and 39 to the wires 38ᵃ and the successive electrodes, to the wires 38, the sewage or other liquid being thereby subjected to the action of the electric current as pointed out in the patent above referred to.

In order to prevent solid matter which may be contained in the liquid from accumulating upon the sides of the electrodes and clogging the spaces therebetween, I provide scrapers or agitating members 49, preferably formed of molded insulating material and made in a plurality of integral sections 50 held together by bolts 51 (Figs. 2 and 8) that pass through end portions 49ᵃ which are formed integrally with cross bars or scraping members 52. For each bank of electrodes I provide two vertically spaced agitator or scraper units 49 secured together by means of bolts 53. It will be noted that the scraper or agitator bars 52 are relatively narrow, thus causing little obstruction to the flow of liquid between the electrode plates, while the vertically spaced arrangement insures that the electrodes will be completely cleared of adhering solids across substantially their entire faces. The members 52 may be out of contact with the electrodes and function merely as agitators for the liquid or to break up particles of solid matter floating therein.

The liquid flowing through the tank is subjected to the action of electric current as above indicated, the scraper bars 52 serving the dual purpose of keeping the faces of the electrodes scraped clean and as agitators. The bars 52 are actuated by mechanism which will now be described.

As shown in Fig. 1, I provided a plurality of pillars 54 upon which are supported angle irons 55 (Figs. 2 and 10) and having openings 54ᵃ therethrough for drainage of waste water. Upon the angle irons 55 are carried a plurality of bearing plates 56 upon which a shaft 57 is mounted and to which shaft is secured two cranks 58 each of which has a pin 59 that serves as a bearing for an arm 60. The cranks 58 are secured to the shaft 57 in relatively circumferentially offset relation, as shown in Fig. 4. The inner ends of the two arms 60 are each supported in a bearing 61 carried at the lower end of an arm 62 which is rigidly connected to a rock shaft 64. A plurality of walking beams are secured to each of the two shafts 64, such shafts being mounted upon pillars 65 and base plates 66. The shaft 57 is rotated by means of a motor 67 (Fig. 4), through pinion 67ᵃ, sprocket chain 67ᵇ, sprocket wheels 67ᶜ and 67ᵈ, chain 67ᵉ and a sprocket wheel 67ᶠ. The wheel 67ᶠ is secured to the shaft 57 having the two cranks 58, each of which drives a shaft 64, the shafts 64 being in turn each connected to a group of walking means 63. One motor 67 thus serves to actuate all of the moving parts of one tank.

Each of the beams 63, as shown more clearly in Fig. 2, is provided at its outer end with a bearing 63ᵃ upon which is suspended a link 63ᵇ, the lower end of each link 63ᵇ being connected to a spider 68. Each spider 68 is provided with four arms as shown in Fig. 10 and each arm has connected thereto a rod 69 that extends upwardly through a stuffing box supported by a plate 70 that is embedded in the bottom 19 of the tank. In order to catch liquid that seeps downwardly along the rods 69, I provide drip cups 71 having gutters 72 through which the collected liquid is deflected to a point away from the mechanism beneath the tank, and finally drained off through troughs 73, two of which are shown in Fig. 4. The rod 69 extends through a sleeve 75 (Fig. 11), the upper end of which is closed by a cap 76 which is secured in place by screws 77. Upon the lower end of the sleeve 75 is secured, by a press fit or otherwise, a joint member 78 having an outer ground surface 79 that engages a ground surface of a complementary member 80 and of an annular filler block 81. This form of joint permits the rod 69 to rock slightly under abnormal conditions, as when the scraper bars 52 are deflected by obstructions on electrode plates 30, while at the same time preserving a fluid-tight joint between parts 78 and 80 and 81. The member 78 and block 81 are held in position by means of a screw cap 82.

A screw plug 83 may be removed to permit grease to be forced through openings in the members 80ᵃ and 78, into the sleeve 75 to lubricate the shaft, some of such grease also finding its way around the channel 80ᵃ, to lubricate the co-acting bearing surfaces of the members 78, 80 and 81.

The grease contained within the sleeve 75 and member 78 is held against leakage downwardly along the rod 69 by means of a stuffing box 84 which may be of the usual construction.

Each of the rods 69 is connected at its upper end to the lower group of scrapers 49 (Fig. 2), flanges 49ᵃ (Fig. 8) of such scraper unit 49 being clamped tightly against a fixed collar 69ᵃ, contained on each of the bars of the rods 69, by a nut 85, so that as said rods are reciprocated vertically the scraper units will also be reciprocated.

Each of the spiders 68 is provided with openings for two guide rods 86 (Figs. 2 and 10), to prevent rotative movement of the spiders and consequent binding of the rods 69 in their stuffing boxes.

The rods 69 at their lower ends (Fig. 2) are provided with nuts 88 and washers 89. Springs 90 are interposed between each of the washers 89 and washers 91 hereinafter described, to cushion the moving parts during their reciprocatory movements. It is necessary that the rods 69 be insulated from the mechanism beneath the tank inasmuch as they extend up into the liquid within the tank and such liquid is charged with current passing from the positive to the negative electrodes. For this purpose I provide sleeves 92 of insulating material (see Fig. 2) in the spiders 68. The washers 91 and the washers 89 are all of insulating material, so that the rods 69 do not directly engage the spiders 68. The washers 91 and bushings 92 are held in place by reason of the tension of springs 90.

Upon energization of the motor 67, the shafts 57 and cranks 58 are rotated as above explained, with consequent oscillation of the walking beams 63 and vertical reciprocation of the rods 69 and the scraper units attached thereto.

As shown in Fig. 2, each longitudinal group of scraper units in one row is simultaneously moved in a direction opposite to the adjacent group in the other row, owing to such groups being connected to opposite ends of walking beams 63 that are connected to a common shaft 64, while the two groups adjacent to the other end of the tank, are operated in stepped relation to the first named groups (Figs. 2 and 4); thus the scraper units adjacent to the lower left hand corner of Fig. 4 move upwardly, and the other diagonally disposed scrapers also move upwardly, or downwardly, together, by reason of the offset relation of the cranks 58. This arrangement affords a better mixing of the liquid.

Placing the operating mechanism beneath the tanks permits the covers of the tanks to be easily removed without disturbance to the mechanism, thus avoiding the necessity of dismantling the entire apparatus whenever inspection or replacement of any of the parts within the tank becomes necessary, or avoiding the alternative of mounting the operating mechanism at such distance above the cover of the tank that an excessively high building is required in order to accommodate the apparatus.

Various changes in detail and general arrangement may be made without departing from the spirit and scope of the invention as defined in the accompanying claims.

What I claim is:

1. Liquid treating apparatus comprising a tank, agitating members disposed within said tank, operating mechanism for said members, and driving connections between said agitating members and mechanism extending through the bottom of said tank.

2. Liquid treating apparatus comprising a tank, agitating members disposed within said tank, operating mechanism disposed beneath said tank, and driving connections between said agitating members and said mechanism extending through the bottom of said tank.

3. Liquid treating apparatus comprising a tank, agitating members disposed within said tank, operating mechanism disposed beneath said tank, and driving connections between said agitating members and said mechanism.

4. Liquid treating apparatus comprising a tank, vertically reciprocable agitating members mounted within said tank, an operating rod for said members extending through the bottom of the tank, and means permitting angular movement of said rod, comprising a ball joint having a ground surface to prevent a leakage of fluid therethrough.

5. The combination with a liquid treating tank, an agitating member and a rod for operating said member extending through a wall of the tank, of a stuffing box for said rod secured to said wall and comprising a packing chamber at its lower end and a grease chamber above said packing chamber.

6. The combination with a liquid treating tank, an agitating member and a rod for operating said member extending through a wall of the tank, of a stuffing box for said rod secured to said wall and comprising a packing chamber at its lower end, a grease chamber above said packing chamber, and a supporting structure for said stuffing box comprising a ball joint for permitting angular movement of said rod.

7. The combination with a liquid treating tank, an agitating member and a rod for operating said member extending through a wall of the tank, of a stuffing box for said rod secured to said wall and having a packing chamber at its lower end, and a grease chamber above said packing chamber, and a supporting structure for said stuffing box comprising a ball joint whose inner member forms a part of the stuffing box and whose outer member is secured to said tank wall, the co-acting surfaces of said inner and outer joint members being ground to prevent leakage of fluid and to permit angular movement of said rod.

8. The combination with a tank bottom provided with an opening therethrough, of a perforated supporting member molded therein, a rod extending through said member and the opening in said wall, a ball joint member secured to said supporting member, a second joint member disposed within said first named joint member, a sleeve supported by said inner joint member and surrounding said rod, and openings through said inner and outer joint members through which grease may be introduced into said sleeve.

9. The combination with a tank bottom provided with an opening therethrough, of a perforated supporting member molded therein, a rod extending through said member and the opening in said wall, a ball joint member secured to said supporting member, a second ball joint member disposed within said first named joint member, a sleeve supported by said inner joint member and surrounding said rod, openings through said inner and outer joint members through which grease may be introduced into said sleeve, and a stuffing box for said rod secured to said inner joint member.

10. The combination with a tank bottom provided with an opening therethrough, of a perforated supporting member molded therein, a rod extending through said member and the opening in said wall, a ball joint member secured to said supporting member, a second ball joint member disposed within said first named joint member, a sleeve supported by said inner joint member and surrounding said rod, and passages through said inner and outer joint members through which grease may be introduced into said sleeve, a passage being provided between said inner and outer joint members and communicating with said first named passage for the reception of lubricant.

11. Tank structure comprising bottom and side members of molded material, an opening through said bottom portion, a stuffing box structure for said opening, a movable member within the tank, and operating mechanism for said member extending through said stuffing box.

12. Liquid treating apparatus comprising a tank, two sets of movable structures within said tank, operating connections for each of said structures extending through the bottom of said tank, and mechanism for actuating said connections simultaneously in opposite directions.

13. Liquid treating apparatus comprising a tank, a plurality of rows of agitating members disposed longitudinally of said tank, driving mechanism for said members, and connections whereby transversely adjacent agitating members are simultaneously actuated in opposite directions.

14. Liquid treating apparatus comprising a tank, a plurality of rows of agitating members disposed longitudinally of said tank, driving mechanism for said members, driving connections whereby transversely adjacent agitating members are simultaneously actuated in opposite directions, and driving connections whereby portions of each row of agitating members are simultaneously actuated in opposite directions.

15. Liquid treating apparatus comprising a tank, a plurality of rows of vertically movable agitating members disposed longitudinally of the tank, and means for simultaneously moving transversely adjacent agitating members vertically in opposite directions.

16. Liquid treating apparatus comprising a tank, two rows of electrodes disposed longitudinally of said tank, means for directing a stream of liquid along each row of electrodes, two rows of agitating members respectively disposed adjacent to said rows of electrodes, and means for operating said adjacent members in predetermined relation.

17. Liquid treating apparatus comprising a tank, two rows of electrodes disposed longitudinally of said tank, means for directing a stream of liquid along each row of electrodes, two rows of agitating members respectively disposed adjacent to said rows of electrodes, and means for simultaneously moving the agitating members of one row in directions opposite to the movements of the agitating members of the adjacent row.

18. Liquid treating apparatus comprising a tank, two rows of electrodes disposed longitudinally of said tank, means for directing a stream of liquid along each row of electrodes, two rows of agitating members respectively disposed adjacent to said rows of electrodes, and means for simultaneously moving an associated group of the agitators of one row in one direction and another thereof in the opposite direction.

19. Liquid treating apparatus comprising a tank, two rows of electrodes disposed longitudinally of said tank, means for directing a stream of liquid along said rows of electrodes, two rows of agitating members respectively disposed adjacent to said rows of electrodes, means for simultaneously moving the agitators adjacent one end of one row and the agitators adjacent the opposite end of the other row in the same direction, and means for simultaneously moving the agitators of the respective rows adjacent one end of the tank in opposite directions.

20. Liquid treating apparatus comprising a tank, agitating members disposed within said tank, means for simultaneously moving a diagonally disposed series of agitators in one direction and means for simultaneously moving another diagonally disposed group of agitators in the opposite direction.

21. Liquid treating apparatus comprising a tank, two rows of agitating members disposed within said tank, said rows being divided into longitudinally disposed groups, a drive shaft common to all said agitating members, and circumferentially offset connections between said agitating members and said drive shaft whereby the group of agitating members adjacent to one end of the tank will be moved in stepped relation to a group adjacent to the other end of said tank.

22. Liquid treating apparatus comprising a tank, agitating members disposed within said tank and arranged in pairs disposed transversely of said tank, rocker arms to the opposite ends of each of which one agitating member of each pair is connected, a drive shaft for said rocker arms, and circumferentially offset connections between said drive shaft and the rocker arms adjacent to the respective ends of said tank, whereby the rocker arms adjacent to the respective ends of the tank will be simultaneously moved in opposite directions.

23. Liquid treating apparatus comprising a tank, agitating members disposed within said tank and arranged in pairs, a rocker arm for each pair and having its opposite ends connected to one agitator set of each pair, a rock-shaft for actuating one group of rocker arms, a rock shaft for actuating another group of rocker arms, a drive shaft, and circumferentially offset connections between said drive shaft and the respective rock-shafts.

24. Liquid treating apparatus comprising a tank, agitating members disposed within said tank and arranged in pairs, a rocker arm for each pair and having its opposite ends connected to one agitator of each pair, a rock-shaft for actuating one group of rocker arms, a rock shaft for actuating another group of rocker arms, and means for simultaneously moving said rock-shafts in opposite directions.

25. The combination with a tank wall provided with an opening therethrough, of a rod extending through said opening, a ball joint member secured to said wall and surrounding said rod, a second ball joint member disposed within said first named joint member, a passage between said joint members, and an opening through said outer joint member through which lubricant may be introduced into said passage.

26. Liquid treating apparatus comprising a tank, groups of electrodes in said tank, electrical connections between said groups for connecting them in series, and two terminals connected respectively to the end groups of said series.

27. Liquid treating apparatus comprising a tank of molded material provided with an opening adjacent to each end thereof, groups of electrodes in said tank, electrical connections between said groups for connecting them in series, a terminal disposed within each of said openings and connected to an end group of electrodes, and a packing gland for each of said openings, to prevent flow of liquid therethrough.

28. Liquid treating apparatus comprising a tank provided with side portions of molded material having openings therethrough, electrodes disposed within said tank, electrical connections between said electrodes for connecting them in series, and terminal members extending through said openings and connected to the electrodes at the opposite ends of said series.

29. Liquid treating apparatus comprising a tank provided with side portions of molded material having openings therethrough, electrodes disposed within said tank, electrical connections between said electrodes for connecting them in series, terminal members extending through said openings and connected to the electrodes at the opposite ends of said series, and packing gland structure surrounding said terminals and preventing flow of liquid through said openings.

30. Electrolyzing apparatus for liquids, comprising a tank, electrodes disposed within said tank, movable members disposed adjacent to said electrodes, operating mechanism for said members, and driving connections between said movable members and mechanism extending through the bottom of said tank.

31. Electrolyzing apparatus for liquids, comprising a tank, electrodes disposed within said tank, movable members disposed adjacent to said electrodes, operating mechanism disposed beneath said tank, and driving connections between said movable members and said mechanism extending through the bottom of said tank.

32. Electrolyzing apparatus for liquids, comprising a tank, electrodes disposed within said tank, movable members disposed adjacent to said electrodes, operating mechanism disposed beneath said tank, and driving connections between said movable members and said mechanism.

33. Electrolyzing apparatus for liquids, comprising a tank, spaced electrodes disposed within said tank, movable members disposed between said electrodes, operating mechanism disposed beneath said tank, and driving connections between said movable members and said mechanism.

34. Liquid treating apparatus comprising a tank provided with a side portion of molded material having an opening therethrough adjacent to each end thereof, electrodes disposed within said tank, electrical connections between said electrodes, terminal members extending through said openings and connected to the electrodes at the opposite ends of said series, and packing gland structure surrounding said terminals and preventing flow of liquid through said openings.

35. Tank structure comprising a hollow end portion provided with superposed conduit passages, a second end portion, and side and bottom walls connected to said end portions, the said passages serving as conduits for a flow of liquid to the tank and the drainage of liquid therefrom, respectively.

36. Tank structure comprising a hollow end portion provided with passages, a horizontally disposed partition between said passages, a second end portion, side walls connected to said end portions, a bottom wall connected to said end portions in a plane substantially parallel to that of said partition, means providing communication between the said upper conduit and the interior of the tank, and means providing communication between the lower conduit and the space beneath said bottom.

37. Electrical liquid treating apparatus comprising a tank having a bottom inclined to the horizontal, electrodes disposed within said tank, agitating structure co-acting with said electrodes, and means external to said tank and extending through a wall thereof for actuating said agitating structure.

38. Electrical liquid treating apparatus comprising a tank having a bottom inclined to the horizontal, electrodes disposed within said tank, agitating structure co-acting with said electrodes, and means extending through said bottom and operated from the exterior of said tank for actuating said agitating structure.

39. Electrical liquid treating apparatus of large capacity comprising an electrolyzing tank having walls molded independently of each other of concrete or equivalent, a connecting member at the joint of neighboring walls and yielding under the effects of expansion, electrodes within said tank, and means for passing the liquid to be treated through said tank.

40. Electrical liquid treating apparatus of large capacity comprising an electrolyzing tank molded of concrete or equivalent, banks of electrodes in said tank, agitating structure co-acting with said electrodes, and means extending through a wall of said tank below the liquid level therein for actuating said agitating structure.

41. Electrical liquid treating apparatus of large capacity comprising an electrolyzing tank molded of concrete or equivalent, banks of electrodes in said tank, agitating structure co-acting with said electrodes, and means extending through the bottom of said tank for actuating said agitating structure.

42. Electrical liquid treating apparatus of large capacity comprising an electrolyzing tank molded of concrete or equivalent, the bottom of said tank being inclined to the horizontal, banks of vertically disposed electrode plates disposed in said tank, agitator structure co-acting with said electrodes, and means extending through said bottom of said tank and movable vertically for actuating said agitator structure.

43. Electrical liquid treating apparatus comprising a tank, electrode structure therein, co-acting agitator structure, a wall of said tank being of molded material, a member molded in said wall, registering apertures in said wall and said member, means for actuating said agitator structure extending through said apertures, and means carried by said member forming a rocking bearing for said means.

In testimony whereof I have hereunto affixed my signature this 3rd day of July, 1923.

FRANK N. MOERK.